(No Model.)
W. OVERAKER.
STOCK TETHER.
No. 381,273. Patented Apr. 17, 1888.
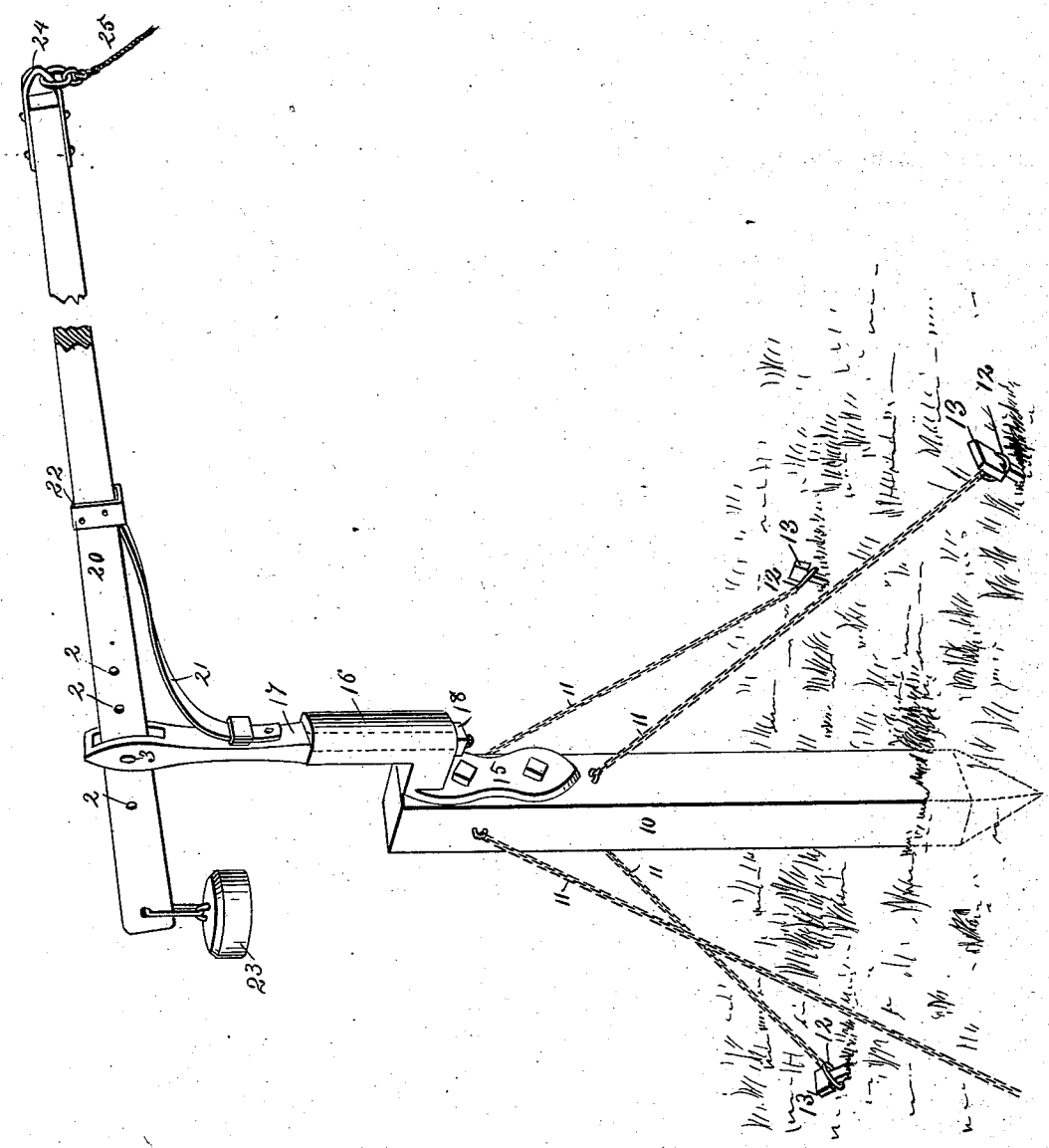
WITNESSES:
J. D. Garfield
C. Sedgwick
INVENTOR:
W. Overaker
BY Munn & Co.
ATTORNEYS.

UNITED STATES PATENT OFFICE.

WILLIAM OVERAKER, OF HILLSBOROUGH, NORTH CAROLINA.

STOCK-TETHER.

SPECIFICATION forming part of Letters Patent No. 381,273, dated April 17, 1888.

Application filed August 5, 1887. Serial No. 246,182. (No model.)

*To all whom it may concern:*

Be it known that I, WILLIAM OVERAKER, of Hillsborough, in the county of Orange and State of North Carolina, have invented a new and Improved Stock-Tether, of which the following is a full, clear, and exact description.

My invention relates to the construction of a cheap, durable, and efficient tether, wherein the parts are so arranged that it will be impossible for the animal to become entangled in the tie rope.

Reference is to be had to the accompanying drawing, forming a part of this specification, in which the figure is a perspective view of my improved stock-tether.

In the drawing above referred to, 10 represents a post or stake that is driven or otherwise firmly planted in the ground, said post being braced by properly-arranged guy-chains 11, that are preferably provided with rings 12, through which there are passed headed stakes 13. To the upper end of the post 10 there is bolted a bracket, 15, formed with an upwardly-extending tubular socket, 16. Within the bore of the socket 16 there is arranged the shank of a vertical standard, 17, said standard being held to place by a nut, 18, as indicated. The upper end of the standard 17 is slotted, and in the slot so formed there is pivotally mounted a beam, 20, that is normally upheld by a spring, 21, said spring being secured to the standard 17, and being arranged so as to have a certain amount of play in a stirrup-like loop, 22, that is carried by the beam. To the short end of the beam 20 there is attached a weight, 23, while to the end of the long arm there is secured a shackle, 24, through the medium of which the tie-rope 25 is attached to the beam.

In operation, the animal is secured to the tie-rope 25 and will be free to graze about the post 10 anywhere within a radius equal to the combined length of the rope and the long arm of the beam 20, any slack in the rope being taken up as the animal advances toward the foot of the post by the elevation of the free end of the long arm of the beam through the action of the spring 21 or the weight 23.

Now, although I have represented my improved form of tether as provided with both a spring and a weight, it will be, of course, seen that the spring might be dispensed with and the weight alone employed, and if the parts are so arranged it might become necessary to properly balance the beam, and to this end I have formed a number of apertures, 2, through any one of which the pivot-bolt 3 might be passed. The socket 16 and its supporting-bracket are preferably formed by casting, and this method will be found to produce a socket and bracket which will be much cheaper and better than the old form of wooden socket.

Having thus described my invention, what I claim as new, and desire to secure by Letters Patent, is—

The stock-tether comprising the supporting stake or post braced in position by chains or ropes connected to said post or stake and to pegs driven into the ground, the bracket fixed or bolted to the stake or post and provided with an offset having a tubular socket, the standard having a shank let into and held in said socket, the pivoted and adjustable beam extending through a slot in said standard and having applied to its outer free end a shackle to which is connected the tie-rope, and a spring connected at one end to said standard and having at its opposite end a loop through which passes the said beam, substantially as set forth.

WILLIAM OVERAKER.

Witnesses:
A. W. GRAHAM,
JNO. K. HUGHES.